Figure 1:
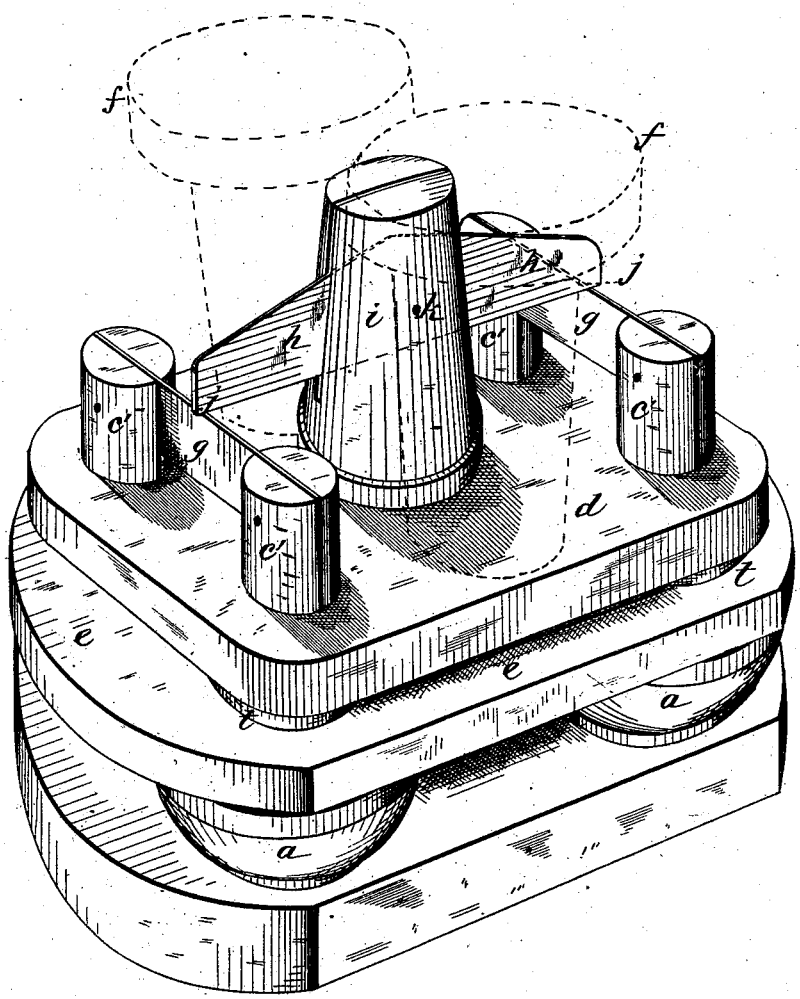

S. HIPKINS, Jr.
Glass Mold.

2 Sheets—Sheet 1.

No. 224,433.  Patented Feb. 10, 1880.

Attest,
W. H. H. Knight,
Floyd Norris.

Inventor,
Stephen Hipkins Jr.,
by Johnson and Johnson
Attys

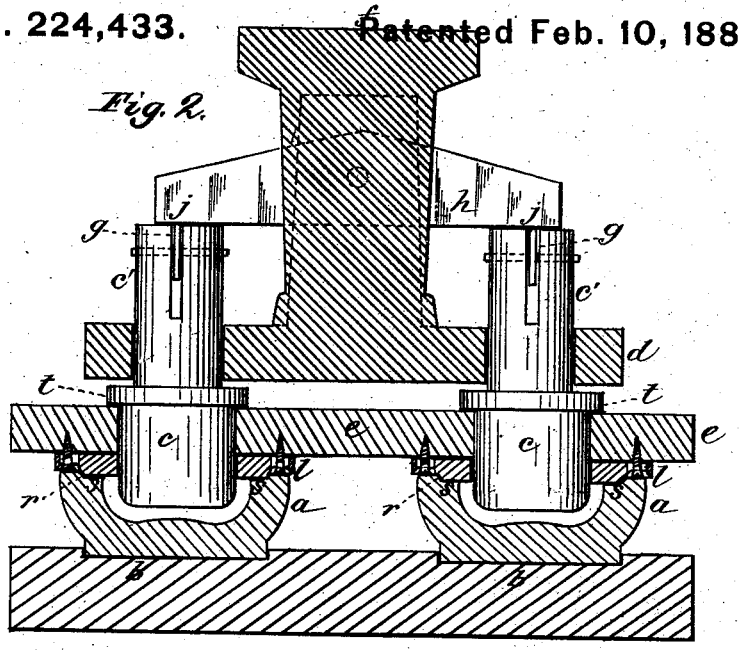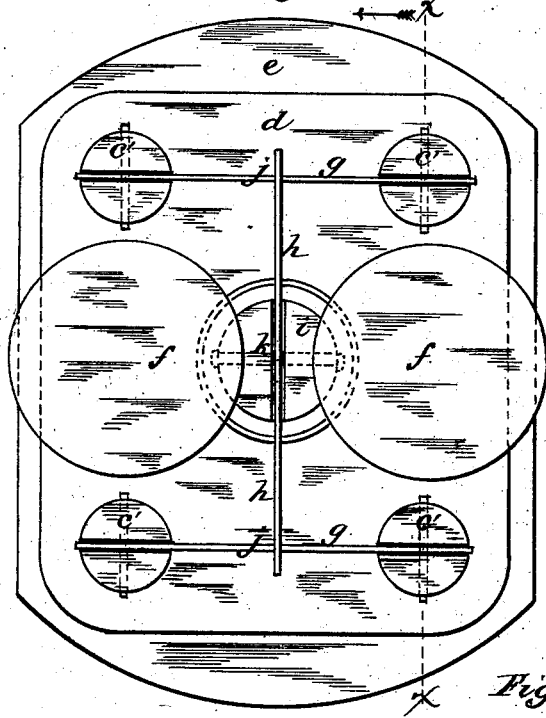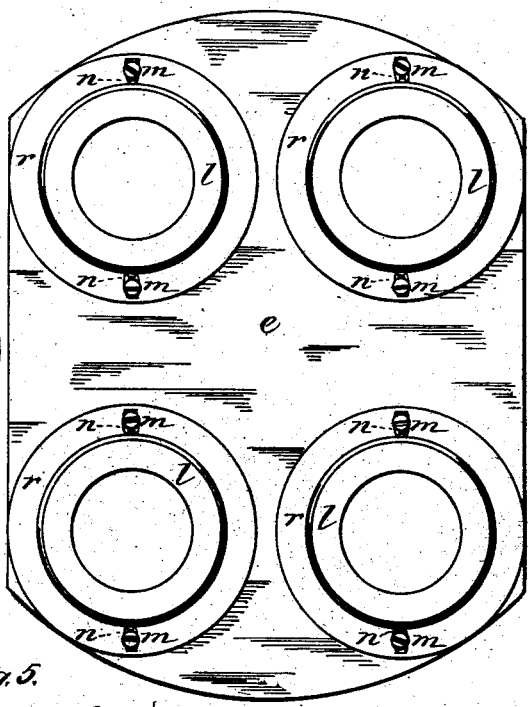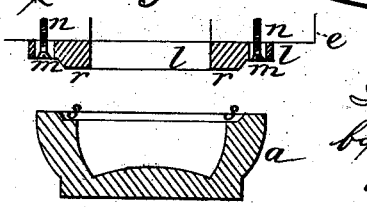

UNITED STATES PATENT OFFICE.

STEPHEN HIPKINS, JR., OF MARTIN'S FERRY, OHIO.

GLASS-MOLD.

SPECIFICATION forming part of Letters Patent No. 224,433, dated February 10, 1880.

Application filed December 1, 1879.

*To all whom it may concern:*

Be it known that I, STEPHEN HIPKINS, Jr., of Martin's Ferry, in the county of Belmont and State of Ohio, have invented certain new and useful Improvements in Glass-Molds, of which the following is a specification.

In the manufacture of glassware I use four molds and corresponding pressing-plungers, operating in pairs by equalizing-levers, and a cross equalizing-beam mounted in a centrally-located column carried by the plunger-head, whereby each of the four plungers has a co-operative action by direct pivotal connections, and each pair of plungers are adapted for co-operative action by a beam adapted to act from a central pivot-point as an equalizing bearing-fulcrum for the lever-connections of the plungers, and adapting them for simultaneous operation without positive connections of said equalizing-beams, and by such means compensate for any difference in the amount of molten glass placed in the molds, and greatly facilitate the operation by producing four articles of glassware of the same or different patterns at one stroke of the pressing-machine.

In molds of this kind the working-joints for the plungers in the guide-plate are constantly subjected to a cutting action of the glass to such an extent as to produce an imperfect or irregular edge of the molded article; and to avoid this objection, and to prevent such cutting action, I provide the under side of the guide-plate at the several plunger-ways with separate joint-rings, adapted to form covers to the molds around the plungers, and secured in a manner to allow of their removal and replacement when joint-worn, thus avoiding the expense in having to replace the guide-plate as an entirety, which is a matter of great importance and advantage in glass-molds.

These joint-rings are secured in a manner to adapt them for expansion and contraction under the action of the heat; and to prevent their warping and cause them to maintain a flush fitting with the molds they are provided with a re-enforcing face collar or swell, which bounds the eye or ring joint, each mold for this purpose being provided with an annular recessed seat, the counterpart of and which receives the said ring-collar, and forms a perfect joining and guide in seating the ring-plate for the action of the plungers, while at the same time maintaining the perfect matching of the plungers with the molds.

The molds may be independently seated in recesses in the bed-plate, to allow of their separate removal to discharge the molded article; or they may be fixtures with or formed in said bed-plate.

In connection with plungers controlled in pairs by equalizing fulcrum-bearings, each plunger is provided with a collar-stop acting directly upon the guide-plate to limit its projection into the mold, whereby perfect articles are pressed in all the molds, or in such only into which the molten glass may have been deposited, for while the four plungers are connected for co-operative action from a single central point, the one yielding in harmony with another to adapt themselves to any inequalities of the amount of material in the molds, yet neither can descend into the mold below the proper point.

The adjustment of the pivoted equalizing-beam must be such as to give the proper equal bearing upon the plunger-levers at all times and from a point equidistant from all the plungers, and with sufficient play to compensate for the expansion of the parts in operating the plungers.

Referring to the accompanying drawings, Figure 1 represents a view, in perspective, of a glass-mold embracing my invention; Fig. 2, a partial section of the same on the line $x\, x$ of Fig. 1; Fig. 3, a top view of the same; Fig. 4, the under side of the guide-plate, showing the removable joint-rings; and Fig. 5, a section of one of the molds and the collar-joint forming ring of the guide-plate.

The molds $a$ are separately seated in holding-recesses $b$ in the bed-plate, and they may be of the same or of one or more different patterns, as their separately seating allows of such changes and of their separate handling to discharge the molded articles. They may, however, be fixtures with the bed-plate or formed therein.

I use four such molds with plungers $c$, adapted for conjoint action, carried by a plunger-head, $d$, and operating through holes in a guide-plate, $e$, which carries covering-rings for the molds, and which rings form guides and wearing-joints for the plungers operating therewith.

The plunger-head is connected to the press by separate columns $f\,f$, or in any suitable manner. The plungers, while being adapted for conjoint action, are also adapted for simultaneous action by means of levers $g\,g$, pivoted to the guide-stems $c'$ of the plungers above their operating head, and an equalizing-beam, $h$, pivoted to a central column, $i$, of such head in such manner as to form fulcrum-points $j\,j$ for the plunger-connecting levers. These fulcrum-points are equidistant from the plunger-pivots and from the central pivot, $k$, of the beam $h$, so that from this central point each plunger is controlled, and thereby allows them all to act equally when the same quantity of glass is placed in each mold, or one or more of the plungers may adapt itself to any inequalities of the quantity of glass which might be in their respective molds; but to whatever extent this unequal action of the plungers, the pressure is rendered equal from the central fulcrum, making a sort of system of connections, each having the same working relation to a point common to them all, thereby rendering it practicable to produce four articles of glassware at one stroke of the press.

I do not use the guide-plate to form a cover and wearing-joints for the plungers, as heretofore, but I provide said guide-plate with separate joint-rings $l$, adapted to form the wearing-joint for each plunger and a cover for each mold around the plunger, and by this means save the ring-plate from being cut out at the plunger-joints by the action of the glass. These supplemental joint-rings are secured to the under side of the guide-plate, so as to allow of their removal and replacement by new ones, and to admit of expansion and contraction from the heat, such securing means being by screws $m$ and slots $n$, or otherwise. These supplemental joint-rings are re-enforced by a face swell or collar, $r$, which forms, in fact, the plunger wearing-joint and the cover for the mold, with which it maintains a flush fitting within an annular recessed seat, $s$, the counterpart of said swell or collar. The increased thickness given the joint-ring by the collar or swell also serves to brace the ring against warping, and keeps it in working condition for a much longer time than could be possible without such re-enforcement. It also serves to prevent the guide-plate and plungers from being moved from matching positions with the molds.

To insure the perfect molding of the articles, even, from any cause, should some of the molds be left empty, the plungers are provided with collars $t$, placed to bear upon the guide-plate so as to limit their projection into the molds; and as such limitation is effected by the direct intervention of the guide-plate, and as the relation of the latter to the molds is not liable to variation, the operation in this particular is effected with precision.

Operating molding-plungers simultaneously by a single carrying-head, in connection with a yielding device for each separate and distinct plunger, to provide for the excess of material in some of the molds, and for the completion of the article in the mold having less material, is not new; and in such molds stops have been used, in connection with the plunger-head, to limit the descent of the plungers against the action of separate and independent yielding springs.

The mold is formed of cast-iron, steel, or other suitable metal, and the guide-stems of the plungers pass through openings in the base-plate of the plunger-head.

The bearing-points $j\,j$ of the equalizing-lever may be made by connections in any suitable manner that will give the proper action of the plungers.

I claim—

1. A glass-mold having four molding-cavities and a corresponding number of pressing-plungers operated simultaneously at each stroke of the press, in combination with a pressing and yielding device consisting of levers connecting the plungers in pairs and an equalizing-beam pivoted upon the plunger-head and adapted to operate upon the connected plungers from a central point, substantially as and for the purpose herein set forth.

2. In a glass-mold, the combination, with the guide-plate, of joint-rings for the plungers, secured to the under side of said guide-plate and adapted for removal and replacement, substantially as and for the purpose herein set forth.

3. In a glass-mold, the combination, with the guide-plate, of collar joint-rings for the plungers, having slots for their securing-screws, whereby provision is made for the expansion and contraction of said joint-ring.

4. The plungers, their connecting-levers, and the equalizing-beam, forming a pressing and a yielding device for the plungers, in combination with collar-stops on said plungers adapted to bear directly upon the guide-plate, substantially in the manner and for the purpose herein set forth.

5. The four molds connected for conjoint action, and controlled in such action from a single central point on the plunger-head, the ring-plate provided with supplemental joint-rings, and the molds adapted to receive said joint-rings as covers thereto, all constructed for operation substantially as herein set forth.

In testimony whereof I have hereunto set my hand.

STEPHEN HIPKINS, JR.

Witnesses:
J. F. MILLER,
JAMES W. SHIPMAN.